United States Patent [19]
Marcus

[11] 4,114,986
[45] Sep. 19, 1978

[54] REVERSIBLE SIDE MOUNT MIRROR

[75] Inventor: Konrad H. Marcus, Holland, Mich.

[73] Assignee: Prince Corporation, Holland, Mich.

[21] Appl. No.: 825,097

[22] Filed: Aug. 16, 1977

[51] Int. Cl.² ............................................. G02B 17/00
[52] U.S. Cl. ................................... 350/282; 248/479
[58] Field of Search ............. 350/281, 282; 280/289; 74/501 M; 318/128; 248/478–480

[56] References Cited
U.S. PATENT DOCUMENTS

| 2,989,896 | 6/1961 | Bertell | 350/282 |
|---|---|---|---|
| 3,666,354 | 10/1970 | Russel | 350/281 |
| 3,810,690 | 5/1974 | Klein et al. | 350/282 |
| 3,870,404 | 3/1975 | Wilson et al. | 350/281 |
| 4,011,769 | 3/1977 | Davis | 248/479 |
| 4,031,771 | 6/1977 | Daly et al. | 248/479 |

FOREIGN PATENT DOCUMENTS

| 209,930 | 7/1955 | Australia | 350/282 |
|---|---|---|---|
| 2,411,319 | 11/1975 | Fed. Rep. of Germany | 350/281 |

*Primary Examiner*—John K. Corbin
*Assistant Examiner*—B. W. de los Reyes
*Attorney, Agent, or Firm*—Fisher, Gerhardt & Groh

[57] ABSTRACT

A reversible, side mounted rearview mirror for vehicles adapted to be mounted at the exterior of the vehicle and having opposed reflective surfaces one of which is suitable for daytime use and the other which is suitable for nighttime use. The mirror is supported within the housing for rotation about a horizontal axis and for swinging movement about a vertical axis at one end of the mirror to provide a full range of adjustment and to permit selecting one or the other of the reflective surfaces.

12 Claims, 5 Drawing Figures

U.S. Patent  Sept. 19, 1978  4,114,986
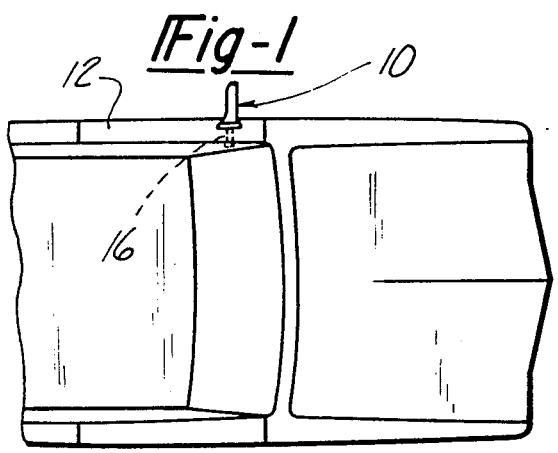
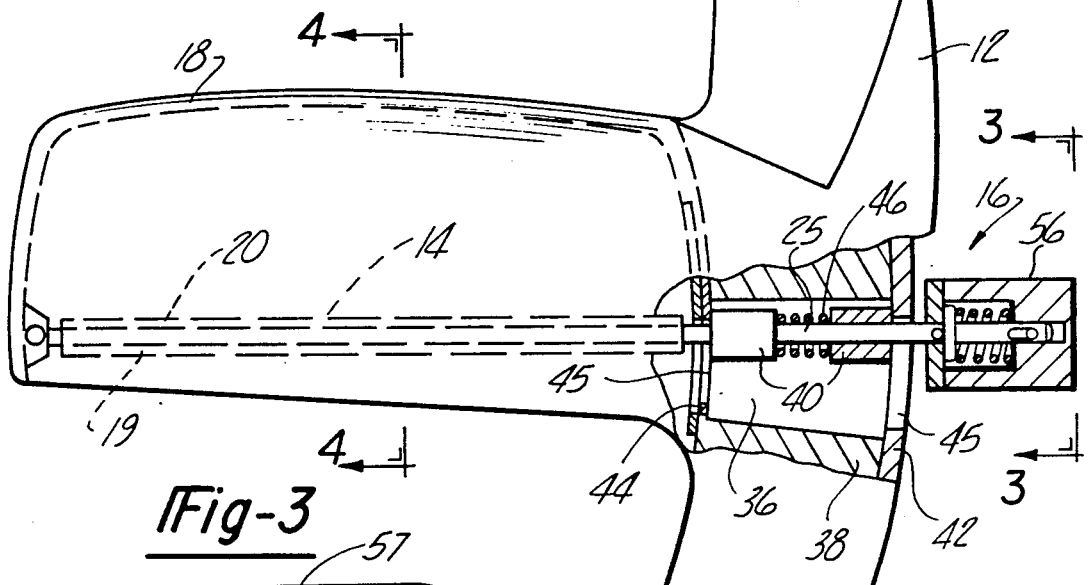
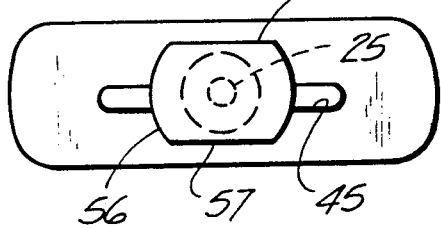
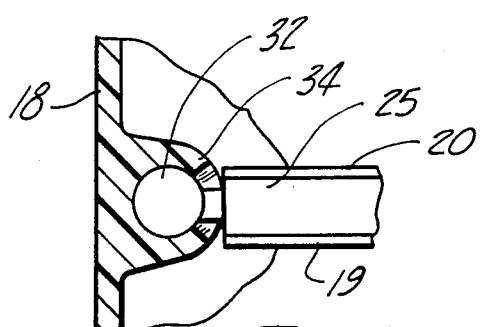
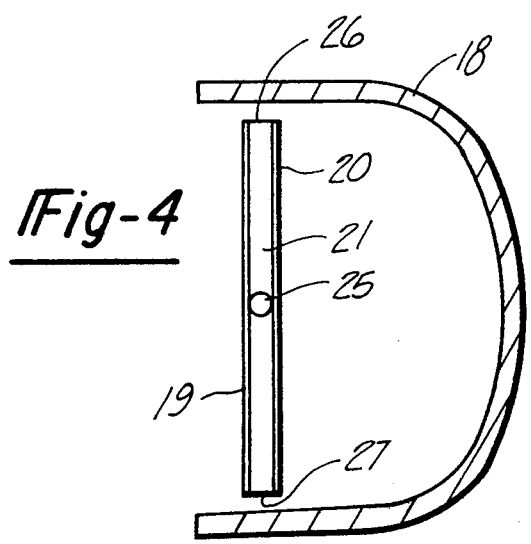

REVERSIBLE SIDE MOUNT MIRROR

This invention relates to vehicle rearview mirrors and particularly to rearview mirrors which are mounted exteriorly of the vehicle and are suitable for both day and nighttime viewing.

Rearview mirrors used in the interior of vehicles are commonly provided with a bright reflective surface for daytime viewing. A transparent glass plate is disposed in front of the reflective surface and makes it possible to tilt the bright reflective surface upwardly at night so that it reflects the dark vehicle interior and deflects the bright lights of following traffic upwardly leaving a residual image on the surface of the glass plate. Unfortunately, such mirrors usually are not satisfactory for rearview mirrors mounted on the exterior of vehicle doors or fender panels because at night stray light will prevent a clear reflection and may result in a double image. Also, in the case of exterior mirrors controlled from the interior of the vehicle, separate controls are needed to change the mirror position to suit the driver and to tilt the mirror for nighttime driving. Usually, remote controlled mirrors employ multiple cable arrangements which are complex and highly unreliable because of stretching of the cable and the like. In the case of day-night mirrors, the problem is compounded because of the necessity of an additional control.

It would be highly desirable and is an object of this invention to provide an outside or side mounted rearview mirror for a vehicle which affords both day and nighttime viewing positions.

Another object of the invention is to provide such a rearview mirror in which the image is reflected directly from the mirror surface in both its daytime position and nighttime positions.

Still another object of the invention is to provide a side mounted rearview mirror in which the controls are simple and eliminate the need for cable arangements.

A rearview mirror has been provided for mounting on the exterior of a vehicle which makes it possible not only to remotely adjust the mirror to the proper angular position for viewing by an operator of the vehicle but also makes is possible to remotely change from a daytime bright image viewing surface to a darkened night type of mirror surface. The mirror arrangement includes opposed mirror surfaces, one for nighttime viewing and one for daytime viewing which may be rotated 180 degrees to change from one surface to the other as the occasion requires and also permits changing the horizontal angle of the mirror relative to the vehicle and the vertical angle of the mirror to properly position the reflective mirror surface for viewing by the occupant of the vehicle. The control mechanism includes a control member which extends directly through a wall of the vehicle and permits rotation of a control about a generally horizontal axis and pivoting of the control about a generally vertical axis, the horizontal and vertical axes being disposed to intersect with each other.

These and other objects will become apparent from the following description and drawings in which:

FIG. 1 is a top plan view of an automotive vehicle embodying the side mounted rearview mirror of the present invention;

FIG. 2 is a sectional view of the mirror arrangement seen in FIG. 1 but at an enlarged scale;

FIG. 3 is a view taken generally in the direction of arrow 3 in FIG. 2;

FIG. 4 is a cross-sectional view taken on line 4—4 in FIG. 2; and

FIG. 5 is a view at an enlarged scale of a portion of the mirror seen in FIG. 2.

Referring to the drawings, an embodiment of the invention in the form of a side mounted rearview mirror arrangement is designated generally at 10 and is adapted to be supported on a door or on a wall 12 of a vehicle passenger compartment. In this case the mirror is shown supported at the operators side of the vehicle but it could be positioned in other locations also. The rearview mirror arrangement 10 includes a mirror subassembly 14 mounted on the exterior of the vehicle and a control mechanism 16 mounted opposite the mirror assembly 14 and in the interior of the vehicle.

The mirror arrangement 10 includes a support member or housing 18 mounted on the exterior of the vehicle. The housing 18 forms a protective cowl for the mirror assembly 14 and is open rearwardly of the vehicle to expose the mirror assembly 14 to viewing by an occupant inside the vehicle.

The mirror assembly 14 is generally rectangular and includes a pair of mirrors 19 and 20 mounted on opposite side of a spacer member 21 and having reflective surfaces facing in opposite direction. The surface of the mirror 19 may be of a type producing a bright image for daytime use and the surface of mirror 20 may be of a type producing a softer image for nighttime use. The reflective surfaces of the mirrors 19 and 20 preferably are such that reflection is produced directly from the surfaces thereby avoiding the possibility of double images particularly during nighttime operation.

The spacer member 21 is mounted on a shaft 25 which is disposed midway between upper and lower edges 26 and 27 of the mirror assembly 14. The outboard end of the shaft 25 is provided with a ball fitting 32 which is received in a socket fitting 34 rigidly mounted on and within the support member or housing 18.

The inboard end of shaft 25 is supported in a horizontally extending slot 36 formed in a mounting member 38 adapted to be mounted within the door or wall panel 12 of the vehicle. The slot 36 is of a sufficient vertical height to receive a pair of rollers 40 mounted on the shaft 25 in spaced apart relationship. The lateral edges of the slot 36 are defined by arcuate, uniformly spaced wall portions 42 and 44. The walls 42 and 44 are provided with enlongated aligned slots 45 having a vertical dimension or width slightly larger than the diameter of the shaft 25 but smaller than the diameter of the rollers 40 to permit sliding movement of the shaft in the slot.

A spring 46 is disposed between the rollers 40 to urge the rollers in opposite directions and against the wall 42 and 44. A rubber seal 48 is mounted on the shaft 25 so that upon movement of the shaft in the slot 36, the seal 48 closes the slot 45 in the wall 42.

The end of the shaft 25 is provided with a control knob 56 non-rotatably connected to the shaft 25 in any conventional manner. The knob 56 has opposed flat surfaces 57 by which the position of the shaft 25 may be sensed by the fingers of an operator.

Rotation of the knob 56 rotates the shaft 25 and makes it possible to present either the reflective surface of mirror 19 or the reflective surface of mirror 20 to the rearwardly facing opening in the housing 18 so that an occupant in the vehicle may observe the relfective face. As a result, the knob 56 may be turned, depending on lighting conditions, to expose either a daytime or nighttime reflective surface. The vertical angle of the mirror face relative to the vehicle also can be adjusted by slight turning movement of the knob 56.

The horizontal angle between the mirror face and the vehicle is adjusted by moving the knob in a fore-and-aft direction in the slot 36. During such sliding movement the rollers 40 serve to guide and maintain the inboard end of the shaft 25 in a generally horizontal path. The outboard end of the shaft 25 as defined by the ball fitting 32 pivots in the socket 34. Proper positioning of the mirror face for observation by an occupant of the vehicle requires horizontal angular displacement of the shaft relative to the ball and socket 32, 34 and vertical angular displacement by rotation of the mirror 14 about the axis of the shaft 25. The axis for horizontal angular adjustment and the axis for rotation of the shaft for changing the vertical angle of adjustment intersect with each other at the center of ball portion 32 and are disposed in the same imaginary plane.

Once the proper horizontal and vertical angular adjustment of the mirror 14 is achieved for any given viewer it is a simple matter to change from the daylight reflective face of mirror 19 to the nighttime reflective face of mirror 20 by rotating the mirror assembly 180 degrees. Flat surfaces 55 assist in judging when the mirror has been rotated one half revolution and no further adjustment normally is required.

A side mounted rearview mirror has been provided in which opposed reflective surfaces may be usable either in the daytime or nighttime and in which the selection of the desired reflective surface and the positioning of that reflective surface for viewing by an operator within the vehicle all are achieved by a single directly controlled shaft member which is exposed within the vehicle but is connected to the mirror at the exterior of the vehicle thereby simplifying the remote controls by which the mirror is adjusted.

The embodiments of the invention in which an exclusive property or privilege is claimed are defined as follows:

1. A reversible rearview mirror for vehicles comprising; a support member adapted for mounting on the exterior of a vehicle, a shaft mounted relative to said vehicle with one end disposed exteriorly of the vehicle and the other end within the passenger compartment of the vehicle, means supporting said shaft for rotation about its longitudinal axis and for pivotal movement about a vertical axis, a mirror member having oppositely facing mirror surfaces for day and night use on opposed surfaces thereof, said mirror member being mounted on said shaft for rotation of a selected one of said mirror surfaces to a viewing position and rotation 180° to present the other of said surfaces in said viewing position, said mirror member being mounted for pivotal movement therewith for adjustment to an angular position relative to said vehicle.

2. The combination of claim 1 in which said support member forms a housing and in which said shaft is movable in said housing to present a selected surface of said mirror in position for viewing.

3. The combination of claim 1 in which said shaft is supported for pivotal movement about a generally vertically extending axis normal to the longitudinal axis of said shaft.

4. The combination of claim 3 in which said vertical axis is normal to a point adjacent the outer end of said shaft.

5. The combination of claim 1 in which said shaft is pivotal about a vertical axis passing through the outer portion of said shaft and in which an inner end of said shaft is supported for general sliding movement in a horizontal direction.

6. The combination of claim 1 in which said shaft rotates on a generally horizontal axis and is supported at an intermediate location by a member slidable in a generally horizontal plane.

7. The combination of claim 1 in which said opposed surfaces of said mirror have different values of reflection.

8. The combination of claim 1 in which said means supporting said shaft includes a ball and socket construction at one end of said shaft.

9. The combination of claim 1 in which said end of said shaft disposed within the passenger compartment is provided with a knob member, said knob member being provided with opposed flat surfaces indicating 180 degrees of rotation of said shaft.

10. The combination of claim 1 in which a portion of said shaft between the exterior end and the end within said passenger compartment is disposed in a horizontal slot for movement of said shaft and mirror about said vertical axis.

11. The combination of claim 10 in which said shaft is supported in said slot on rollers.

12. The combination of claim 11 in which said rollers are biased in opposite directions to frictionally engage walls at opposite edges of said slot.

* * * * *